United States Patent
Lake et al.

(10) Patent No.: US 8,460,588 B2
(45) Date of Patent: Jun. 11, 2013

(54) CROSS DIRECTIONAL ZONED BICOMPONENT FILMS, FILM LAMINATES, AND SYSTEMS AND METHODS FOR MANUFACTURE OF THE SAME

(75) Inventors: Matthew B. Lake, Cumming, GA (US); Bryon Paul Day, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 675 days.

(21) Appl. No.: 11/830,475

(22) Filed: Jul. 30, 2007

(65) Prior Publication Data
US 2009/0035593 A1 Feb. 5, 2009

(51) Int. Cl.
B32B 27/00 (2006.01)
B29C 47/06 (2006.01)

(52) U.S. Cl.
USPC ............ 264/173.14; 264/173.11; 264/173.12; 264/173.16; 264/173.17; 264/173.19; 264/174.1; 264/174.11; 264/209.7; 425/133.5

(58) Field of Classification Search
None
See application file for complete search history.

(56) References Cited

U.S. PATENT DOCUMENTS

| | | | |
|---|---|---|---|
| 3,797,987 A | | 3/1974 | Marion |
| 4,100,237 A | * | 7/1978 | Wiley ........................... 264/40.6 |
| 4,272,312 A | * | 6/1981 | Thompson ............... 156/244.11 |
| 4,348,346 A | * | 9/1982 | Thompson .................... 264/146 |
| 4,479,989 A | * | 10/1984 | Mahal .......................... 428/35.5 |
| 4,521,359 A | * | 6/1985 | Tsien ............................. 264/104 |
| 4,533,510 A | | 8/1985 | Nissel |
| 4,556,376 A | * | 12/1985 | Sievers et al. .............. 425/133.5 |
| 4,663,220 A | * | 5/1987 | Wisneski et al. ............. 428/221 |
| 4,731,004 A | | 3/1988 | Wenz, Jr. |
| 4,784,815 A | | 11/1988 | Cloeren et al. |
| 4,804,566 A | * | 2/1989 | Paul et al. ..................... 428/35.7 |
| 4,894,291 A | | 1/1990 | Ofstein |
| 5,085,927 A | * | 2/1992 | Dohrer .......................... 428/220 |
| 5,120,484 A | * | 6/1992 | Cloeren .................... 264/173.12 |
| 5,318,737 A | * | 6/1994 | Trabert et al. ........... 264/173.16 |
| 5,332,613 A | * | 7/1994 | Taylor et al. .................. 428/152 |
| 5,336,545 A | | 8/1994 | Morman |
| 5,451,357 A | * | 9/1995 | Cloeren ................... 264/173.16 |
| 5,516,474 A | | 5/1996 | Cloeren |
| 5,716,570 A | * | 2/1998 | Peiffer et al. ................. 264/146 |
| 5,789,065 A | | 8/1998 | Haffner et al. |
| 5,849,401 A | * | 12/1998 | El-Afandi et al. ............ 428/215 |
| 5,863,377 A | | 1/1999 | Rohrbach |

(Continued)

FOREIGN PATENT DOCUMENTS
WO WO2005082598 * 9/2005

OTHER PUBLICATIONS

International Search Report and Written Opinion, PCT/IB2008/052882 (Feb. 25, 2009).

(Continued)

Primary Examiner — Jeffrey Wollschlager
(74) Attorney, Agent, or Firm — Armstrong Teasdale LLP

(57) ABSTRACT

Coextruded films provide cross directional zoned multiple components side-by-side to one another. Systems and methods relate to coextruding such films. During coextrusion, a first polymer conjoins with a second polymer while a temperature differential is maintained between the first and second polymers. This temperature differential is selected to reduce a difference between the viscosities of the first and second polymers making the viscosity of the first polymer close enough to the viscosity of the second polymer to avoid separation upon coextrusion. Further, the films may form a layer in subsequent lamination to other material layers.

6 Claims, 5 Drawing Sheets

U.S. PATENT DOCUMENTS

| | | | |
|---|---|---|---|
| 6,245,401 B1* | 6/2001 | Ying et al. | 428/58 |
| 6,409,494 B1 | 6/2002 | Voss | |
| 6,896,832 B2* | 5/2005 | Kegasawa et al. | 264/173.12 |
| 7,090,479 B2* | 8/2006 | Kegasawa et al. | 425/133.5 |
| 7,494,331 B2* | 2/2009 | Kegasawa et al. | 425/133.5 |
| 2004/0108621 A1* | 6/2004 | Kegasawa et al. | 264/171.1 |
| 2006/0147685 A1* | 7/2006 | Potnis et al. | 428/212 |
| 2006/0147716 A1* | 7/2006 | Braverman et al. | 428/411.1 |
| 2007/0112137 A1* | 5/2007 | Niemark | 525/192 |
| 2007/0262484 A1* | 11/2007 | Fujii et al. | 264/173.12 |
| 2008/0157424 A1* | 7/2008 | Fujii et al. | 264/171.15 |

OTHER PUBLICATIONS

Elkouss et al., "Influence of Polymer Viscoelasticity on the Residence Distributions of Extruders," AIChE Journal, Apr. 2006, vol. 52, No. 4, pp. 1451-1459.

* cited by examiner

CROSS DIRECTIONAL ZONED BICOMPONENT FILMS, FILM LAMINATES, AND SYSTEMS AND METHODS FOR MANUFACTURE OF THE SAME

BACKGROUND OF THE INVENTION

Coextrusion of two or more different polymers or polymer compositions enables forming composite sheet or film products that have components defined by distinct layers or zones corresponding to each material extruded. Depending on how the compositions are extruded, each material may be laminated one on top of another across the film and/or be disposed across the film side-by-side to one another. Some coextrusion techniques include independent temperature control associated with the different polymers in order to accommodate layers having thermally distinct processing requirements or equalize layer thickness when each material is laminated one on top of another across the film. Another issue that arises in particular with respect to side-by-side interfacing of the polymers in the film involves mechanical stability where the different polymers connect. When the different polymers are side-by-side, edge seams provide relatively less surface area to establish lamination than if the polymers are laminated one on top of another across the film.

The films in which the different polymers are edge laminated require selection of the different polymers to ensure compatibility during processing. If the different polymers lack compatibility, the components separate upon extrusion and fail to form a unified film inclusive of each region of the different polymers across the film. This requirement places an undesirable limitation on what polymers may be chosen. Compatibility needs thus dictate the different polymers that can be effectively used, thereby limiting or preventing selection of the different polymers based on other criteria such as costs, physical characteristics or other properties of actual commercial interest.

Therefore, there exists a need for improved cross directional zoned multiple component films, laminates utilizing the films, and systems and methods of coextruding the films.

SUMMARY OF THE INVENTION

In one embodiment, a method of coextruding polymers into an edge laminated film includes supplying a first polymer melt stream at a first temperature to a first inlet of a coextruder body and supplying a second polymer melt stream at a second temperature different than the first temperature to a second inlet of the coextruder body. Further, the method includes directing the first and second melt streams through first and second flow passageways passing through the body to a converged output of the streams, wherein the first flow passageway includes a transverse diverging chamber laterally oriented relative to the second flow passageway at the converged output. Outputting the converged output from the body forms the edge laminated film continuous across a full width of the film.

For one embodiment, an extrusion system for coextruding polymers into edge laminated films includes a coextruder body having an output converged from first and second flow passageways passing through the body to respectively first and second inlets, wherein the first flow passageway includes a transverse diverging chamber laterally oriented relative to a portion of the second flow passageway preceding the output. A first melt stream input couples to the first inlet, and a second melt stream input couples to the second inlet. The second melt stream input is thermally isolated from the first melt stream input and controllable to a different temperature than the first melt stream input.

According to one embodiment, an edge laminated film includes a first polymer shaped in a planar form. The planar form is continuously extended by a second polymer laminated along an edge of the first polymer as defined by a thickness of the planar form. The first polymer has a viscosity versus temperature curve, as measured at shear rates of 500 1/s, 1000 1/s and 1500 1/s, at least 10 percent different than the second polymer throughout a melt temperature range of each of the polymers, wherein the viscosity is determined by a capillary rheometer equipped with a 1 mm die utilizing a 10:1 length to diameter ratio and a 60° entrance angle. The melt temperature ranges are defined as a minimum initial softening temperature for a respective one of the polymers to a maximum of 25-50° C. less than a decomposition peak, as determined by a differential scanning calorimetry (DSC) curve obtained for a 5.5 mg sample of the respective one of the polymers heated at 20° C./minute and cooled at 10° C./minute in the presence of either nitrogen or oxygen.

BRIEF DESCRIPTION OF THE DRAWINGS

So that the manner in which the above recited features of the embodiments can be understood in detail, a more particular description of the embodiments, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments relate to coextrusion of two or more materials that have disparate viscosities at one common melt temperature but are processed at different temperatures during the coextrusion. The materials may include two different polymers extruded side-by-side such that lamination occurs along an edge seam bisecting a thickness of the film and extending in a "machine direction." As used herein, the term "machine direction" or "MD" refers to length of the film in the direction in which the film is produced. The term "cross machine direction" or "CD" means the width of film, i.e., a longest dimension of the film in a direction generally perpendicular to the MD. For example, a first polymer may be maintained in a first portion of the width of the film and a second polymer may be maintained distinct from the first portion in a second portion of the width of the film. In some embodiments, multiple edge laminations between polymers may form CD zones that provide multiple stripes of the polymers across the film at any interval in the CD. The edge lamination may occur within a central region of the film and not necessarily at or toward CD sides of the film.

Figure 1:
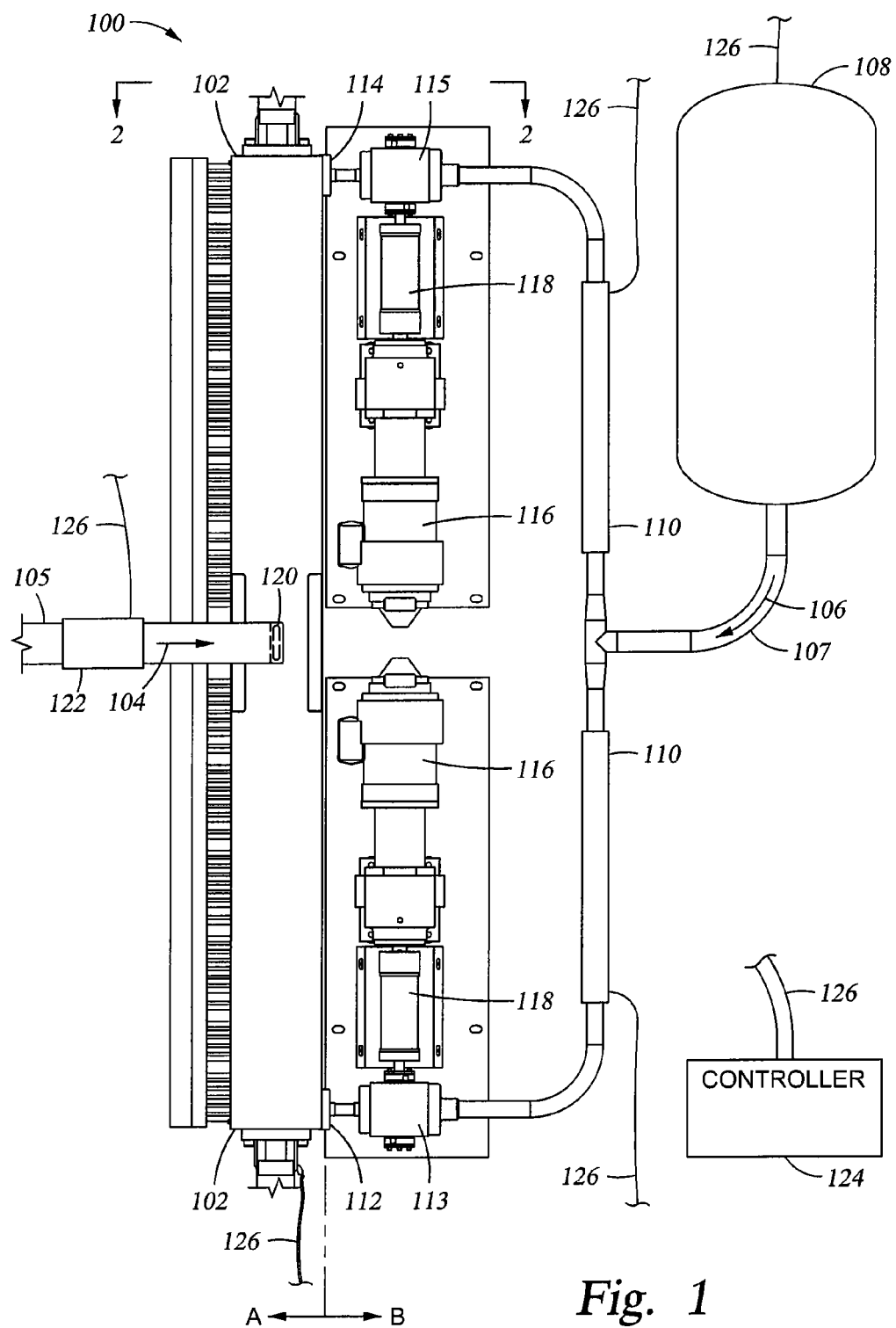
FIG. 1 is a top view of a system for coextruding different polymers into an edge laminated film, according to an embodiment.

FIG. 1 illustrates a system 100 for coextruding different polymers into an edge laminated film, according to one embodiment. The system 100 includes a coextruder 102 supplied with first and second polymers 104, 106 (represented by arrows) distributed via, respectively, first and second conduits 105, 107. The second conduit 107 contains the second polymer 106 melted and flowing out from an extruder 108 prior to branching of the second conduit 107 to enable coupling to first and second inputs 112, 114 into the coextruder 102. The first and second inputs 112, 114 at spaced apart locations along the coextruder 102 may coincide with approximate locations where the second polymer 106 is output when making the film. This arrangement may serve to limit dwell time of the second polymer 106 in the coextruder 102, for reasons explained further herein. To this end, position and number of separate streams of the second polymer 106 entering the coextruder 102 though individual inputs, e.g., the first and second inputs 112, 114, may vary for particular applications and may depend on quantity and location of stripes in the film formed by the second polymer 107. While some embodiments may utilize a common melt pump for two or more inputs, a first melt pump 113 in communication with the first input 112 along with a second melt pump 115 in communication with the second input 112 independently control urging of the second polymer 106 into the coextruder 102. Corresponding motors 116 couple through respective gear boxes 118 to power the first and second pumps 113, 115. Second conduit heaters 110 maintain the second polymer 106 at an identified second temperature upon exiting the extruder 108.

A similar arrangement as described with respect to the second polymer 106 may provide extrusion and pumping of the first polymer 104 into the coextruder 102. The first conduit 105 couples, for example, to a single central input 120 of the coextruder 102, but may couple to a plurality of additional inputs or at another location depending on, for example, placement of the first polymer 104 across the film that is produced. Desirably, first conduit heaters 122 maintain the first polymer 104 at an identified first temperature, which is different than the second temperature, prior to entry into the coextruder 102. For some embodiments, heating of the coextruder 102 to about the first temperature establishes a first thermal zone A of the system 100 isolated and different than a second thermal zone B of the system 100. Thus, the second thermal zone B corresponds to supply of the second polymer 106 to the coextruder 102 while temperature of the first polymer 104 is associated with the first thermal zone A.

A controller 124 regulates heating of the system 100 to achieve a given thermal differentiation between the zones A, B. To this end, the controller 124 is programmed with, or programmable with, one or more temperature set points for various components of the system 100. The controller 124 may be a general-purpose computer (e.g., a workstation functioning under the control of an operating system) or a special-purpose programmable device such as a programmable logic controller (PLC). In operation, the controller 124 sends appropriate control signals along transmission lines or pathways 126 to, for example, the extruder 108, the first and second conduit heaters 122, 110, and the coextruder 102 to adjust heating thereof in order to obtain the temperature set points as predetermined. For some embodiments, the controller 124 provides the first thermal zone A with melt temperature at least 25° C., or at least 50° C., or at least 100° C., different than the second thermal zone B.

Since polymers are generally poor conductors, the second polymer 106 passes through the coextruder 102 without a substantial temperature change toward the first temperature of the coextruder 102 from the second temperature of the second polymer 106 when introduced into the coextruder 102. Further, limiting path length and hence dwell time of the second polymer 106 within the coextruder aids in decreasing thermal influence of the coextruder 102 on temperature of the second polymer 106. The first polymer 104 thus conjoins with the second polymer 106 while a temperature differential is retained between the first and second polymers 104, 106. This temperature differential, which may be about 50° C., is selected to substantially match viscosities of the first and second polymers 104, 106 at the point where the first and second polymers are conjoined. For some embodiments, zoned heating and/or insulating within the coextruder 102 may at least facilitate establishing the temperature difference between the first and second polymers 104, 106. Since temperature differentials as defined herein are based on melt temperatures, the melt temperature of the first and second polymers 104, 106 refers to bulk temp of the respective polymer stream, at the corresponding inputs 112, 114, 120 to the coextruder 102, as taken by a typical melt probe thermocouple.

Criteria for selecting the temperature set points include achieving identified temperatures that are within corresponding processing melt temperature ranges for each of the first and second polymers 104, 106 and that reduce a difference between viscosities of the first and second polymers 104, 106. Reducing the difference between the viscosities of the first and second polymers 104, 106 makes the viscosity of the first polymer 104 close enough to the viscosity of the second polymer 106 to avoid separation (see, FIG. 6 described in more detail below) upon coextrusion. For some embodiments, establishing close proximity in viscosities between the first and second polymers 104, 106 refers to obtaining less than a 50 pascal-second difference between the viscosities that may otherwise differ by at least 50 pascal-second throughout a common (i.e., no independent and different temperature control of the first and second polymers 104, 106) melt temperature range of the first and second polymers 104, 106. In one embodiment, matching of viscosities is achieved at the shear rate of the processing orifice, which as shown is a slot of the coextruder 102 through which the polymers 104, 106 exit. In some embodiments, matched viscosities between the first and second polymers 104, 106 constitute viscosities within about 5 percent, about 10 percent, about 15 percent, or about 20 percent of one another while unmatched viscosities (i.e., without melt temperature control described herein) are not within about 5 percent, about 10 percent, about 15 percent, or about 20 percent of one another. For example, if one viscosity is 100 pascal-second then that viscosity and another viscosity are within 10 percent of one another if the other viscosity is anywhere between 90 pascal-second and 110 pascal-second.

Figure 4:
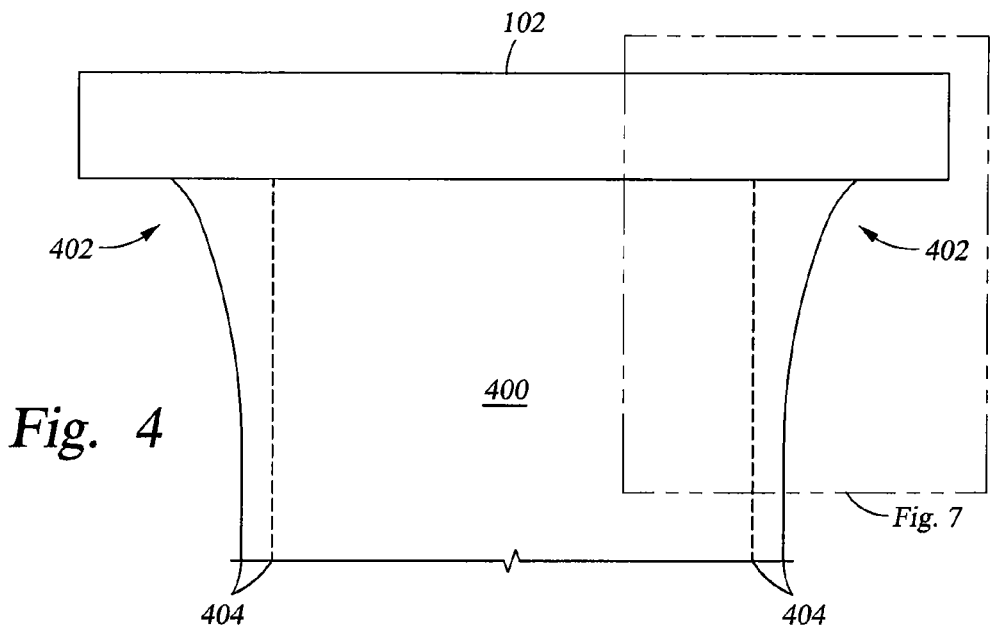
FIG. 4 is a front view of the coextruder outputting the edge laminated film, according to an embodiment.
Figure 5:
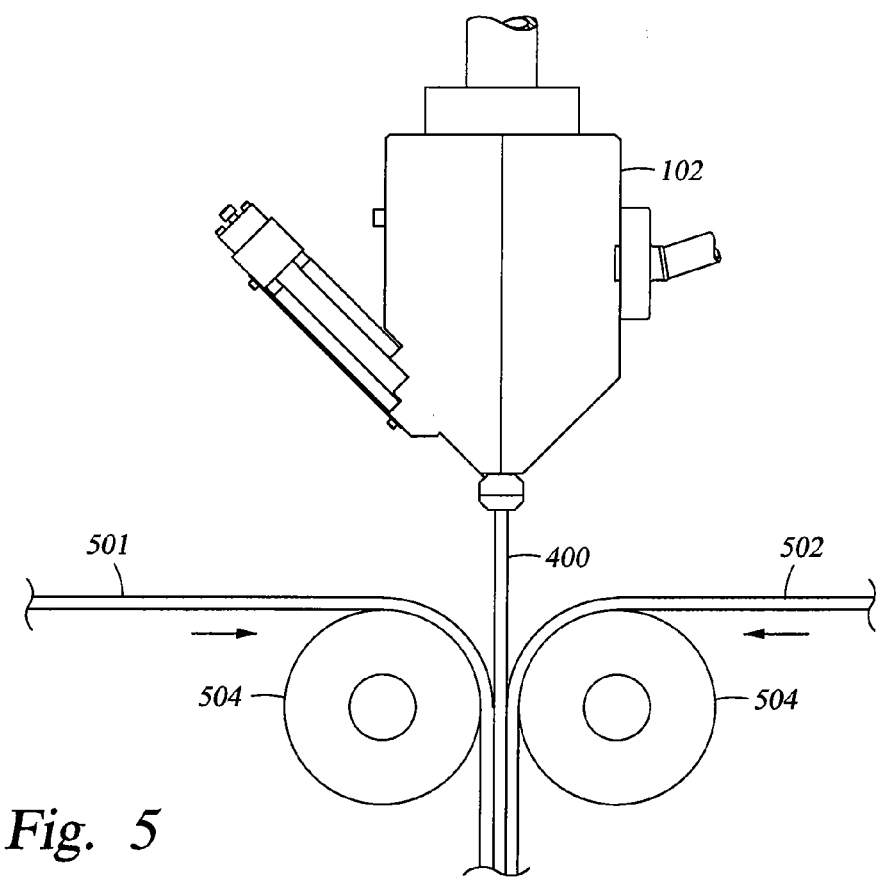
FIG. 5 is a side view of the coextruder outputting the edge laminated film that is subsequently laminated between two additional material layers, according to an embodiment.

As used herein, shear rate is calculated as $6*Q/(W*H^2)$ where Q is flow rate (cubic centimeters per second; cc/sec), W is die wet width (centimeter; cm) that corresponds to the CD dimension of the film 400 at the extruder 102 (see, FIG. 4), and H is die gap (cm) that corresponds to thickness of the film 400 at the extruder 102 (see, FIG. 5). The flow rate may be calculated from the pump rate(s) and densities of the first and second polymers 104, 106 at respective temperatures in the die gap. By way of example for one processing criteria, the shear rate is 1062 1/s given a die wet width of 226 cm, a die gap of 0.0813 cm, an approximated melt density of 0.95 g/cc, and a pump rate of 251 g/s. Based on the foregoing, a different shear rate may exist for each polymer, such as occurs if the throughput and/or density of the first and second polymers 104, 106 are different, and may necessitate appropriate temperature process control. Since shear rate changes with throughput, and some polymers may be more sensitive to the change in throughput than others, a compensatory temperature change to one or both of the first and second polymers 104, 106 may be associated with the throughput change.

Figure 2:
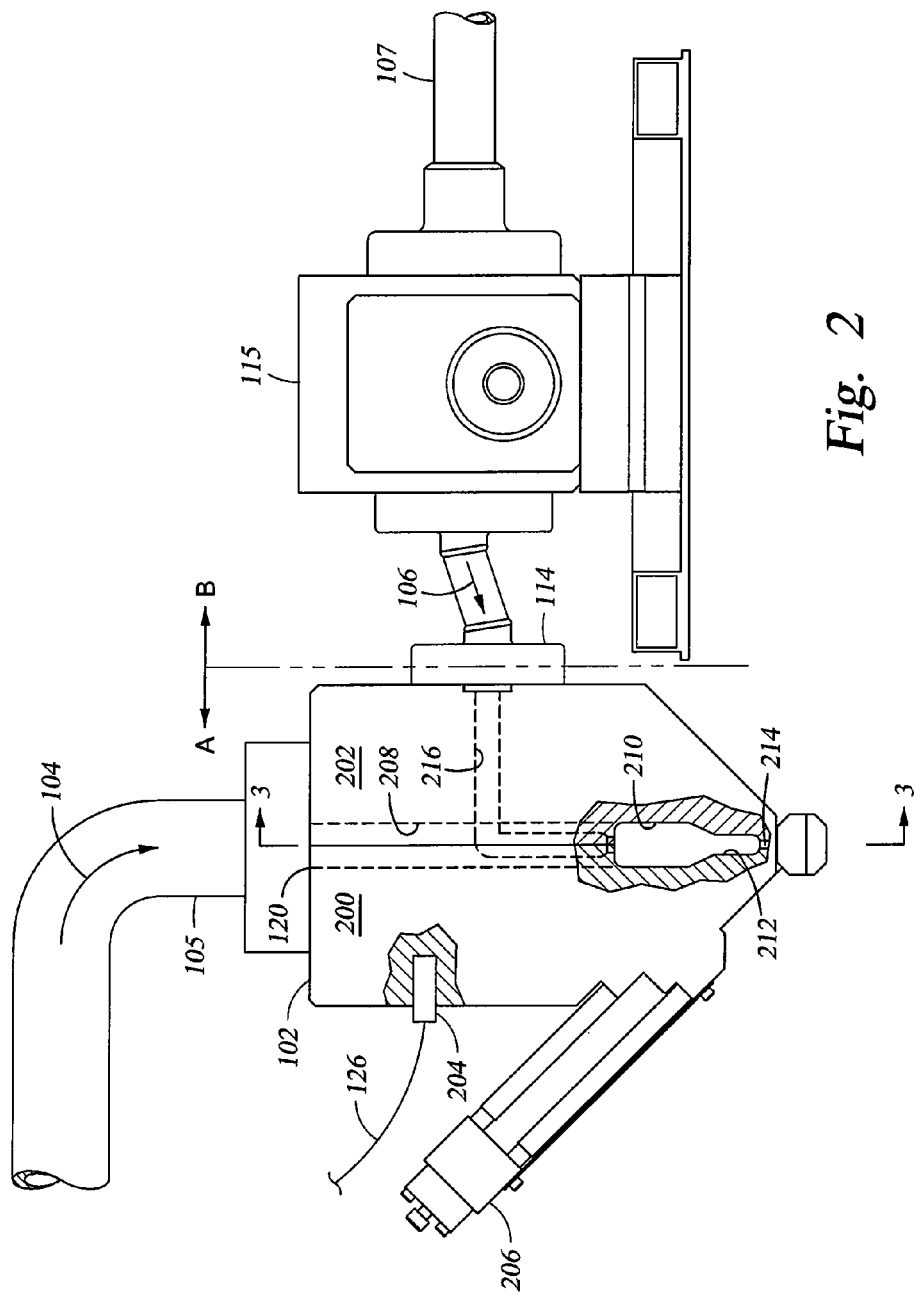
FIG. 2 is a side view of the system taken across line 2-2 in FIG. 1 and illustrating separate feeds into a coextruder of the system, according to an embodiment.

FIG. 2 shows a side view of the coextruder 102 having die body first and second sections 200, 202 mated together. An exemplary heating cartridge 204 along with others embedded into the first and second sections 200, 202 enable manipulating the temperature of the coextruder 102 to, for example, the first temperature. The die body first section 200 may include a die bolt assembly 206 across the CD of the coextruder 102 to provide lip adjustments for controlling thickness of the film produced.

Matching recesses formed on the die body first and second sections 200, 202 may define along an interface between the sections 200, 202 a first polymer melt stream pathway 208, a CD spreading manifold 210, a preland 212 and a land 214. The first polymer melt stream pathway 208 fluidly connects the central input 120 for the first polymer 104 with the CD spreading manifold 210. Porting through the die body second section 202 defines a second polymer melt stream pathway 216 that converges with the first polymer melt stream pathway 208 after the first polymer 104 spreads out in the CD spreading manifold 210. The second polymer melt stream pathway 216 fluidly connects the second input 114 (and the first input 112 that is not visible) for the second polymer 106 to where the second polymer 106 converges with the first polymer 104 in the coextruder 102. Once converged, the first and second polymers 104, 106 pass through the land 214 and thereafter exit from the coextruder 102 to produce the film.

Figure 3:
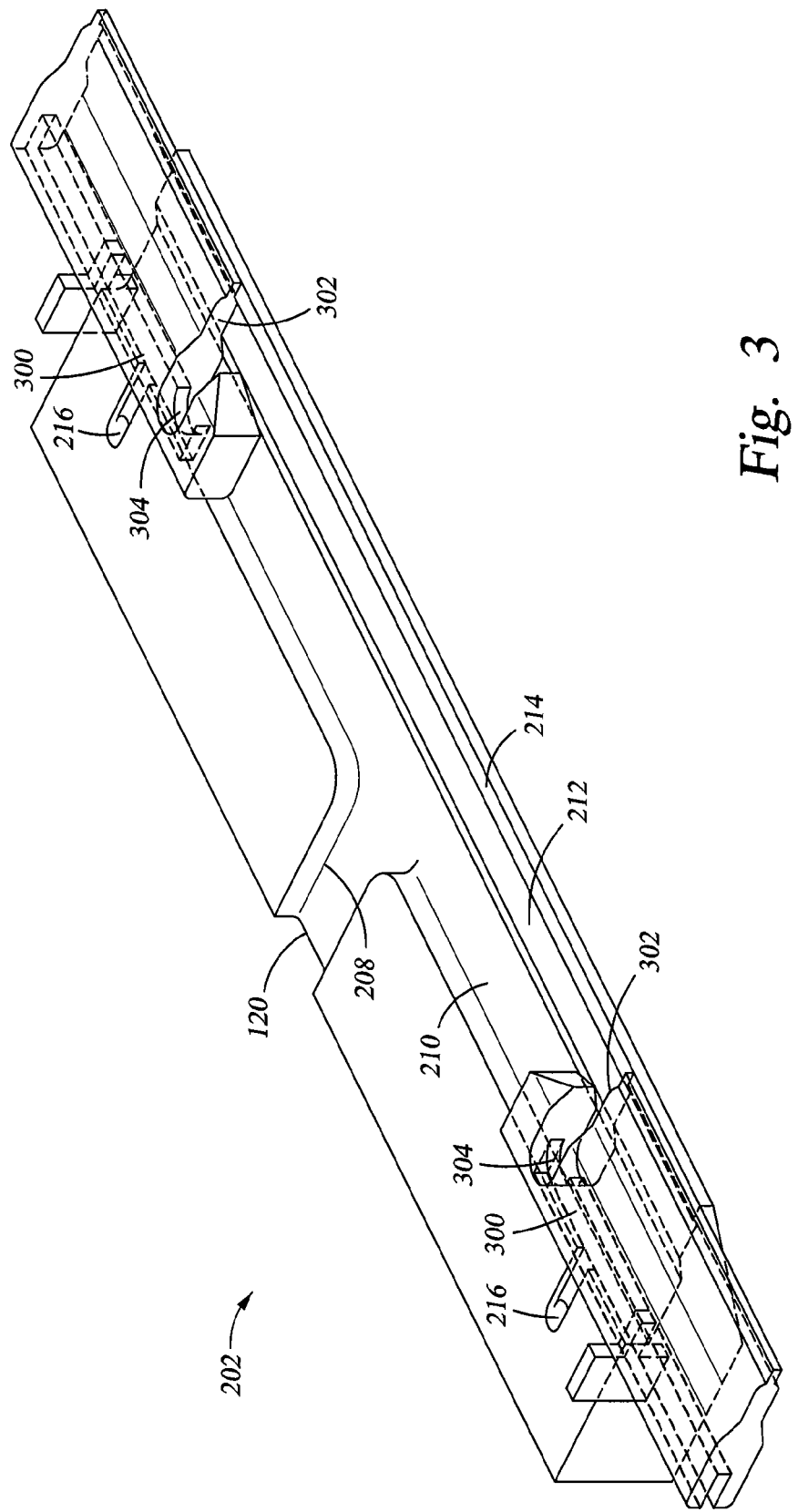
FIG. 3 is a view of a die body first section of the coextruder, according to an embodiment.

FIG. 3 illustrates the die body first section 202 of the coextruder 102. For some embodiments, the second polymer melt stream pathway 216 traverses through channeling 300 of a deckle rod 302 prior to passing through an output 304 from the deckle rod 302 subsequent to convergence of the first and second polymers 104, 106. However, other embodiments contemplate different arrangements for the second polymer melt stream pathway 216, which may not include utilizing a ported and channeled deckle rod.

Figure 7:
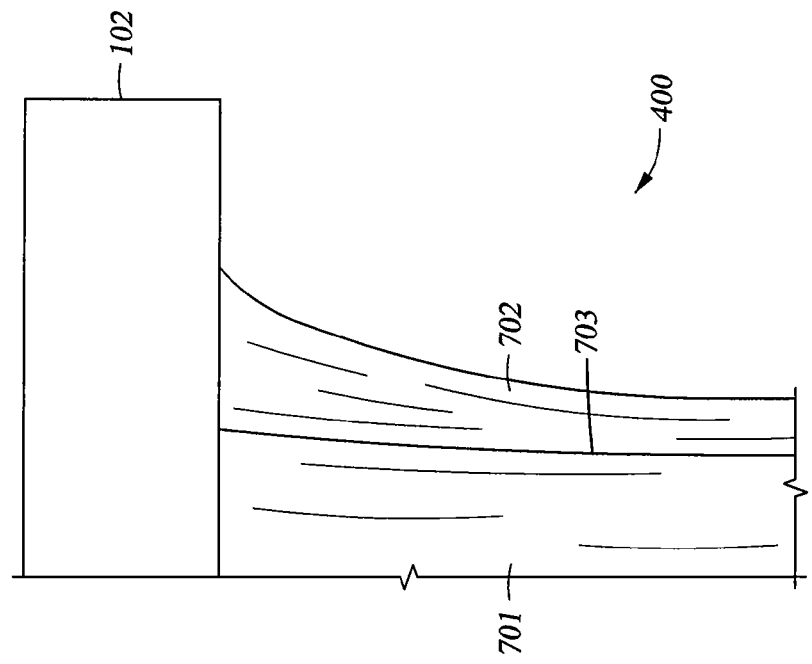
FIG. 7 is a partial front view of the coextruder outputting the edge laminated film, as identified in FIG. 4, made with the first polymer and the second polymer shown in FIG. 6 but processed with viscosity manipulation.

FIG. 4 shows the coextruder 102 outputting an edge laminated film 400. In one embodiment, outputting the polymers may comprise extruding, and more specifically, coextruding, the polymers. The film 400 includes a first section 701 formed by the first polymer 104 bounded on each side by second sections 702 formed of the second polymer 106, as shown in FIG. 7. Necking-in occurs at each side 402 of the film 400 causing contraction in the CD dimensions, for example, from about 2.5 meters to about 2.3 meters. Overall thickness of the film 400 may range from about 25 micrometers to about 1.5 millimeters or be less than 2 millimeters. Due to non-Newtonian flow, the sides 402 end up thicker than a central region of the film 400 and are therefore unusable. Waste areas 404 of the film 400 result from the necking-in at the sides 402 that accordingly requires cutting away of the waste areas 404. Discarding the waste areas 404 without reuse of the waste areas 404 creates additional costs, which can be avoided or reduced if all or parts of the waste areas are recycled (e.g., used as part or all of the second polymer 106) in the manufacture of additional film. Furthermore, material initially forming the waste areas 404 (i.e., the second polymer 106) advantageously includes compositions less expensive than compositions (i.e., the first polymer 104) found in the film 400 between the waste areas 404.

For some embodiments, the first polymer 104 may include an elastomeric polymer that is relatively more elastic than the second polymer 106, which may not be elastomeric. As used herein, the terms "elastic" and "elastomeric" when referring to a fiber, sheet, film or fabric mean a material which upon application of a biasing force, is stretchable to a stretched, biased length which is at least about 160 percent of its relaxed, unstretched length, and which will recover at least 55 percent of its elongation upon release of the stretching, biasing force within about one minute. The first polymer 104 may include, for example, elastomeric polymers that may be elastic polyesters, elastic polyurethanes, elastic polyamides, elastic polyolefins, metallocenes and elastic A-B-A' block copolymers, where A and A' are the same or different thermoplastic polymers, and where B is an elastomeric polymer block, such as styrenic block copolymers.

Suitable elastomeric copolymers include ethylene vinyl acetate (EVA), ethylene-octene copolymers, and ethylene-propylene copolymers. Examples of elastomeric polyolefins include ultra-low density elastomeric polypropylenes and polyethylenes, such as those produced by "single-site" or "metallocene" catalysis methods.

In one embodiment, the first polymer 104 is KRATON G2755™, which is a blend of poly(styrene/ethylene-butylene/styrene), a polyolefin, and a tackifying resin. Any tackifier resin can be used which is compatible with the poly (styrene/ethylene-butylene/styrene) and can withstand the high processing (e.g., extrusion) temperatures. If blending materials such as, for example, polyolefins or extending oils are used, the tackifier resin should also be compatible with those blending materials. Hydrogenated hydrocarbon resins represent examples of tackifying resins. The first polymer 104 may include, for example, from about 20 to about 99 percent by weight elastomeric polymer, from about 5 to about 40 percent polyolefin and from about 5 to about 40 percent resin tackifier. For example, the first polymer 104 may include block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. In some embodiments, the first polymer 104 is a blend of polyethylene (e.g., 5 melt index, MI) with the KRATON G2755™ (e.g., 70 percent 5 MI polyethylene with 30 percent KRATON G2755™).

Any of a variety of thermoplastic elastomers may generally be employed, such as elastomeric polyesters, elastomeric polyurethanes, elastomeric polyamides, elastomeric copolymers, and so forth. For example, the thermoplastic elastomer may be a block copolymer having blocks of a monoalkenyl arene polymer separated by a block of a conjugated diene polymer. Particularly suitable thermoplastic elastomers are available from Kraton Polymers LLC of Houston, Tex. under the trade name KRATON®. KRATON® polymers include styrene-diene block copolymers, such as styrene-butadiene, styrene-isoprene, styrene-butadiene-styrene, and styrene-isoprene-styrene. KRATON® polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. Specific KRATON® block copolymers include those sold under the brand names G 1652, G 1657, G 1730, MD6673, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S elastomeric copolymers available from Kuraray Company, Ltd. of Okayama, Japan, under the trade designation SEPTON®. Still other suitable copolymers include the S-I-S and S-B-S elastomeric copolymers available from Dexco Polymers, LP of Houston, Tex. under the trade designation VECTOR™. Also suitable are polymers composed of an A-B-A-B tetrablock copolymer, such as discussed in U.S. Pat. No. 5,332,613 to Taylor et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

Other exemplary thermoplastic elastomers that may be used include polyurethane elastomeric materials such as, for example, those available under the trademark ESTANE from Noveon, polyamide elastomeric materials such as, for example, those available under the trademark PEBAX (polyether amide) from Atofina Chemicals Inc., of Philadelphia, Pa., and polyester elastomeric materials such as, for example, those available under the trade designation HYTREL from E.I. DuPont De Nemours & Company.

Furthermore, the elastic material may also contain a polyolefin, such as polyethylene, polypropylene, blends and copolymers thereof. In one particular embodiment, a polyethylene is employed that is a copolymer of ethylene or propylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of a linear olefin copolymer is a function of both the length and amount of the α-olefin. That is, the greater the length of the α-olefin and the greater the amount of α-olefin present, the lower the density of the copolymer. Although not necessarily required, linear "plastomers" are particularly desirable in that the content of α-olefin short chain branching content is such that the copolymer exhibits both plastic and elastomeric characteristics—i.e., a "plastomer." Because polymerization with α-olefin comonomers decreases crystallinity and density, the resulting plastomer normally has a density lower than that of thermoplastic polymers (e.g., LLDPE), but approaching and/or overlapping that of an elastomer. For example, the density of the plastomer may be about 0.91 grams per cubic centimeter (g/cm$^3$) or less, in some embodiments from about 0.85 to about 0.89 g/cm$^3$, and in some embodiments, from about 0.85 g/cm$^3$ to about 0.88 g/cm$^3$. Despite having a density similar to elastomers, plastomers generally exhibit a higher degree of crystallinity, are relatively non-tacky, and may be formed into pellets that are non-adhesive and relatively free flowing.

Any of a variety of known techniques may generally be employed to form such polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes.

Particularly suitable plastomers may include ethylene-based copolymer plastomers available under the EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes. Suitable propylene-based plastomers are likewise commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang. et al.; and U.S. Pat. No. 5,596,052 to Resconi, et al., which are incorporated herein in their entirety by reference thereto for all purposes.

For some embodiments, the second polymer 106 includes polyolefins, such as one or more of polypropylene, polyethylene, ethylene copolymers, propylene copolymers, and butene copolymers polypropylene. For example, the second polymer 106 may include all or about 100 percent polypropylene. The second polymer 106 may include a blend of polypropylene and the first polymer 104 (e.g., 50 percent polypropylene and 50 percent the first polymer 104). In some embodiments, the second polymer 106 includes recycled material due to waste areas post lamination (shown in FIG. 5 and described further herein) due to necking-in of an elastomeric film that is laminated between two sheets of nonwoven materials, such as, for example, spunbonded web, meltblown web or bonded carded web. The recycled material may include about 50 percent of the nonwoven material (e.g., polypropylene) and about 50 of the first polymer 104.

Multiple zones of the first and second polymers can be used to provide alternating regions having different functionality.

For example, multiple zones of elastomeric polymer and polypropylene regions across films in some embodiments enable providing CD zones at the polypropylene regions favorable to bonding with non-elastomeric material and that do not create inefficiency caused by bonding to the more expensive elastomeric polymer that may thereby be rendered inelastic. For some embodiments, the term "polymer" as used herein may mean a composition that includes more than one polymer and/or other additives that may not be polymeric but are included with a polymeric material to improve properties of the composition. As an example, the first polymer 104 (e.g., an elastomer impregnated with calcium carbonate) includes a relatively breathable polymer compared to the second polymer 106 (e.g., an elastomer without calcium carbonate) once extruded into a film and activated. For some applications, the first polymer 104 may include a wettable polymer relative to a non-wettable polymer selected for the second polymer 106. Regardless of the purpose or subsequent use of the first and second polymers 104, 106 selected, the viscosity disparity between the first and second polymers 104, 106 at any given single temperature would prevent edge lamination if both the first and second polymers 104, 106 were processed at that temperature.

FIG. 5 illustrates the coextruder outputting the edge laminated film 400 that is subsequently laminated between first and second additional material layers 501, 502. For example, a spunbond material or fabric such as a polypropylene nonwoven may form the additional material layers 501, 502 that can thereby be nonwoven fibrous layers. In operation, the film 400 hangs freely while being fabricated from the coextruder 102 prior to introduction of the film 400 between the additional material layers 501, 502 and into a pair of nip or chilled rollers 504. The film 400 therefore adheres in bonding contact with the additional material layers 501, 502. Other bonding methods can be used to adhere the film 400 to the additional material layers 501, 502, such as, adhesive, thermal, hydroentangling, ultrasonic, and other methods of laminating.

In one embodiment, the additional material layers 501, 502 may be a nonwoven material such as, for example, spunbonded web, meltblown web or bonded carded web. The nonwoven material refers to a structure of individual fibers or threads which are interlaid but not in an identifiable pattern as in a woven fabric. Spunbond material or spunbonded web as used herein refers to facing made of small diameter fibers which are formed by extruding molten thermoplastic material as filaments from a plurality of fine, usually circular capillaries of a spinneret with the diameter of the extruded filaments then being rapidly reduced. Spunbond fibers are generally continuous and have average diameter larger than about 7 microns, more particularly, between about 5 and 40 microns. If the layers 501, 502 are each a web of meltblown fibers, each of the layers 501, 502 may include meltblown microfibers. The layers 501, 502 may be made of fiber forming polymers such as, for example, polyolefins. Exemplary polyolefins include one or more of polypropylene, polyethylene, ethylene copolymers, propylene copolymers, and butene copolymers.

For one embodiment, one or both of the material layers 501, 502 may include a multilayer material having, for example, at least one layer of spunbonded web joined to at least one layer of meltblown web, bonded carded web or other suitable material. A single layer of material such as, for example, a spunbonded web having a basis weight of from about 0.2 to about 10 ounces of material per square yard (osy) or a meltblown web having a basis weight of from about 0.2 to about 8 osy, may form each of the material layers 501, 502. In some embodiments, a composite material made of a mixture of two or more different fibers or a mixture of fibers and particulates may form each of the material layers 501, 502. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel), occurs prior to collection of the meltblown fibers upon a collecting device to form a coherent web of randomly dispersed meltblown fibers and other materials.

When the material layers 501, 502 are each a nonwoven web of fibers, the fibers may be joined by interfiber bonding to form a coherent web structure. Entanglement between individual meltblown fibers may produce this interfiber bonding. While fiber entangling is inherent in the meltblown process, the entangling may further be generated or increased by processes such as, for example, hydraulic entangling or needlepunching. For some embodiments, a bonding agent may increase the desired bonding.

Figure 6:
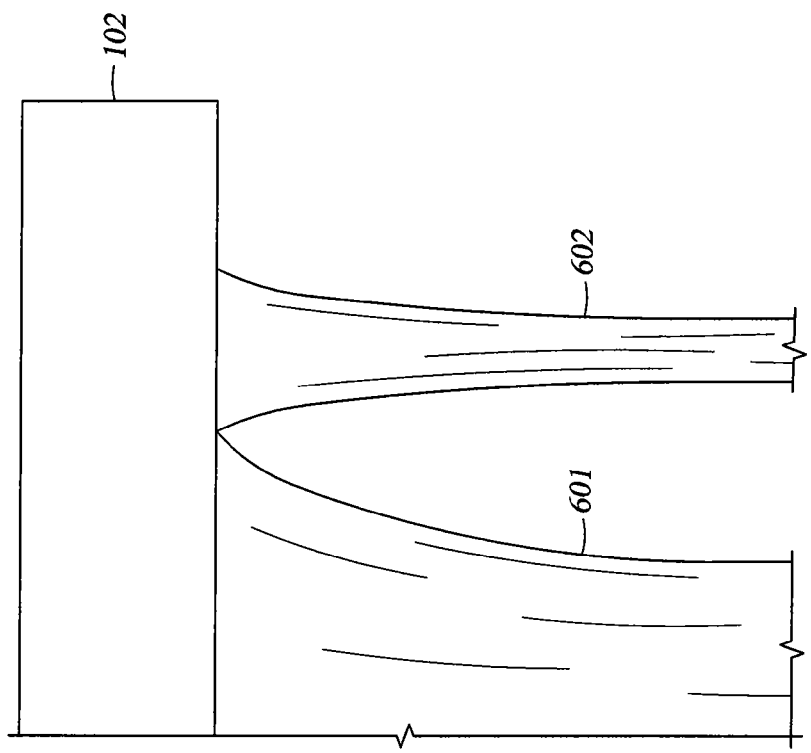
FIG. 6 is a partial front view of the coextruder outputting separate films with each film being mono-component based on respective first and second polymers processed without viscosity manipulation.

FIGS. 6 and 7 show a film exiting the coextruder 102 under two different processing regimes but using the same two different polymers for the first polymer 104 and the second polymer 106 in both regimes. In FIG. 6, separate first and second films 601, 602 extrude from the coextruder 102 with each film being mono-component based on respectively the first and second polymers 104, 106, which are processed without viscosity manipulation. FIG. 7 illustrates the coextruder outputting the edge laminated film 400 made with the first polymer 104 and the second polymer 106 but processed with viscosity manipulation. The first polymer 104 forms the first section 701 of the film 400 and is unitary in structure with the second section 702 formed of the second polymer 106 and side-by-side to the first section 701.

The first section 701 defines a planar form that is continuously extended by the second section 702 laminated along an edge seam 703 of the first polymer 104 as defined by a thickness of the planar form. The first polymer 104 has viscosity versus temperature curves constructed from at least three temperature values, as measured at shear rates of 500 1/s, 1000 1/s or 1500 1/s, at least 10 percent, at least 15 percent, or at least 20 percent, different than the second polymer 106 as calculated relative to the higher viscosity value of each of the polymers throughout a melt temperature range of each of the polymers 104, 106. Exemplary procedures for making such determinations are described below as suitable test methods.

Test Methods:

Melt Temperature Range:

The Melt Temperature Range of a polymer is determined based on the differential scanning calorimetry (DSC) curve obtained using a standard DSC for a 5.5 mg sample of each of the polymer heated at 20° C./minute in the presence of ambient air. The first end point of the Melt Temperature Range is the temperature at the softening peak of the DSC curve. The second end point of the Melt Temperature Range is 25° C. less than the temperature at the degradation peak of the DSC curve.

Melt Temperature Mid-Point:

The Melt Temperature Mid-point is the average of the melt temperature range end points defined above.

Viscosity (at a Particular Temperature and Shear Rate):

The viscosity is determined using a capillary rheometer (e.g., a Dynisco Dual Bore Capillary Rheometer Model #LCR7000) equipped with a 1 mm die utilizing a 10:1 length to diameter ratio and a 60° entrance angle for a user selected temperature and shear rate.

Generation of Viscosity Versus Temperature Curves at Given Shear Rates:

For each polymer, measure the viscosity at each of the end points of the Melt Temperature Range and the Melt Temperature Mid-point at shear rates of 1/500, 1/1000, and 1/1500 1/s. For each shear rate, plot the viscosity (y axis) versus temperature (x axis) graph using linear interpolation between the adjacent points. Include both polymers on the graph for a given shear rate. Make a separate graph for each shear rate. Curves may also be generated for film making process shear rates.

Comparison of Viscosity Versus Temperature Curves:

Using the viscosity versus temperature charts defined above, it can be readily determined whether there is any single temperature at which the viscosities of the two polymers are within any given percent (e.g., 10%) of one another with respect to the higher viscosity. Further, it can be readily determined whether the viscosities of the two polymers can be matched at disparate temperatures.

Example

In one embodiment, a film was prepared as described in relation to FIGS. 1-4. A formulation of 70 percent 5 MI polyethylene and 30 percent KRATON G2755™ was introduced as a first melt stream into a coextruder. Recycled laminate with 50 percent composition equivalent to the first melt stream and a remaining 50 percent being a spunbond grade polypropylene provided a second melt stream into the coextruder for extrusion along each side or edge of the first melt stream. The second melt stream viscosity to melt temperature relationship differs from the first melt stream due to the spunbond grade polypropylene content of the second melt stream. Table 1 as follows illustrates these differences. Viscosities (pascal-second) depicted in Table 1 were determined with a Dynisco Dual Bore Capillary Rheometer Model #LCR7000 viscometer equipped with a 1 mm die utilizing a 10:1 length to diameter ratio and a 60° entrance angle.

TABLE 1

|  |  | Shear Rate | | |
| --- | --- | --- | --- | --- |
|  | Temperature | 500 (1/s) | 750 (1/s) | 1000 (1/s) |
| $1^{st}$ melt stream | 240° C. | 162 | 140 | 121 |
| $1^{st}$ melt stream | 190° C. | 300 | 246 | 207 |
| Polypropylene | 190° C. | 196 | 150 | 123 |
| $2^{nd}$ melt stream | 190° C. | 189 | 152 | 128 |

The first melt stream was introduced into the coextruder at 240° C. while the second melt stream entered the coextruder at 190° C. The coextruder temperature was also at 240° C. The shear rate of the streams at output from the coextruder was calculated to be close to the 1000 1/s shown in Table 1 based on the exemplary calculation described heretofore. A unitary edge laminated film was produced with the first and second melt streams substantially maintaining their initial temperature upon extrusion, as shown in FIG. 7.

For comparison, the first and second melt streams were both introduced into the coextruder at 240° C. during another experiment. The coextruder temperature was also at 240° C. The first melt stream separated from the second melt stream upon extrusion, as shown in FIG. 6.

While the invention has been described in detail with respect to specific embodiments, it will be appreciated that those skilled in the art, upon attaining an understanding of the foregoing may readily conceive of alterations to, variations of and equivalents to these embodiments. Accordingly, the scope of the invention should be assessed as that of the appended claims and any equivalents thereto.

What is claimed is:

1. A method of coextruding polymers into an edge laminated film, comprising:
    supplying a first polymer melt stream at a first temperature to a first inlet of a coextruder body;
    supplying a second polymer melt stream at a second temperature different than the first temperature to a second inlet of the coextruder body, wherein the temperature differential is at least 25° C. different and is selected such that the viscosities of the first and second melt streams are within 10 percent of one another where outputting the converged output from the body occurs;
    flowing the first and second melt streams through first and second flow passageways passing through the body to a converged output of the streams, wherein the first flow passageway includes a transverse diverging chamber laterally oriented relative to the second flow passageway at the converged output, wherein the second inlet is arranged relative to the transverse diverging chamber to limit dwell time for the second melt stream in the coextruder body, thereby maintaining a first thermal zone for the first melt stream and a second thermal zone for the second melt stream in the coextruder; wherein the first thermal zone is isolated and different from the second thermal zone; and
    outputting the converged output from the body to form the edge laminated film continuous across a full width of the film wherein at the converged output the first and second melt streams have a temperature differential relative to one another and wherein the first melt stream includes polyethylene and poly(styrene/ethylene-butylene/styrene) and the second melt stream includes polypropylene, polyethylene, and poly(styrene/ethylene-butylene/styrene).

2. The method of claim 1 wherein the coextruder body is maintained at about the first temperature.

3. The method of claim 1, wherein the first melt stream is maintained in a first portion of the width of the film and the second melt stream is maintained distinct from the first portion in a second portion of the width of the film.

4. The method of claim 1, further comprising selecting melt temperatures of the first and second polymer melt streams to result in the film being unified.

5. The method of claim 1, wherein the first melt stream includes a poly(styrene/ethylene-butylene/styrene) and about 70 weight percent polyethylene and the second melt stream includes a combination of polyethylene and poly(styrene/ethylene-butylene/styrene) and about 50 weight percent polypropylene.

6. The method of claim 5, wherein the first temperature is about 240° C. and the second temperature is about 190° C.

* * * * *